United States Patent [19]

Sonnedecker et al.

[11] 4,344,900
[45] Aug. 17, 1982

[54] FRACTIONATOR TRAY VALVE

[75] Inventors: Ray L. Sonnedecker, Kansas City, Kans.; Ronald P. Martin, Toledo, Ohio

[73] Assignee: Phillips Petroleum Company, Bartlesville, Okla.

[21] Appl. No.: 197,454

[22] Filed: Oct. 16, 1980

[51] Int. Cl.³ .............................................. B01F 3/04
[52] U.S. Cl. ............................ 261/114 VT; 202/158; 261/114 TC
[58] Field of Search ..... 261/114 VT, 114 A, 114 TC; 202/270

[56] References Cited

U.S. PATENT DOCUMENTS

| | | | |
|---|---|---|---|
| 2,578,881 | 12/1951 | Dunn | 261/114 A |
| 2,979,316 | 4/1961 | Houston, Jr. | 261/114 VT |
| 3,055,646 | 9/1962 | Eld et al. | 261/114 VT |
| 3,215,414 | 11/1965 | Van't Sant | 261/114 VT |
| 3,287,004 | 11/1966 | Nutter | 261/114 VT |
| 3,618,912 | 11/1971 | Braun et al. | 261/114 VT |
| 3,618,913 | 11/1971 | Schramm | 261/114 VT |
| 3,770,255 | 11/1973 | Nutter | 261/114 VT |
| 3,815,880 | 6/1974 | Price | 261/114 VT |

FOREIGN PATENT DOCUMENTS 1361579  4/1963  France .................... 261/114 VT Primary Examiner—Richard L. Chiesa

[57] ABSTRACT

A movable valve body or fractionator tray bubble cap or element is equipped with downwardly extending legs or members dependent therefrom so shaped and arranged as to present and place in juxtaposition with an opening in a fractionator plate or tray a periphery of the dependent members somewhat larger than the opening in the tray the members also being so arranged that at least one member fits into the opening and extends to below the tray while another rests at the edge of the opening and is so shaped that application of pressure thereto will momentarily deform that member so that the cap can be and is permanently but movably retained within the opening.

2 Claims, 4 Drawing Figures

FRACTIONATOR TRAY VALVE

BRIEF SUMMARY OF THE INVENTION

A valve body is shaped to have protruding or extending therefrom legs which are sufficiently flexible to permit by application of pressure on the valve body a forcing of at least one leg into an opening in a fractionator tray adapted to receive the same whereupon said leg having regained its original configuration the legs coact with said tray to retain said valve body in movable manner in said opening in said tray.

BRIEF DESCRIPTION OF DRAWING

FIGS. 1 and 2 are drafted to illustrate a valve with only two legs, for simplicity of illustration. FIGS. 3 and 4 illustrate three legs on the valve.

DETAILED DESCRIPTION

Figure 1:
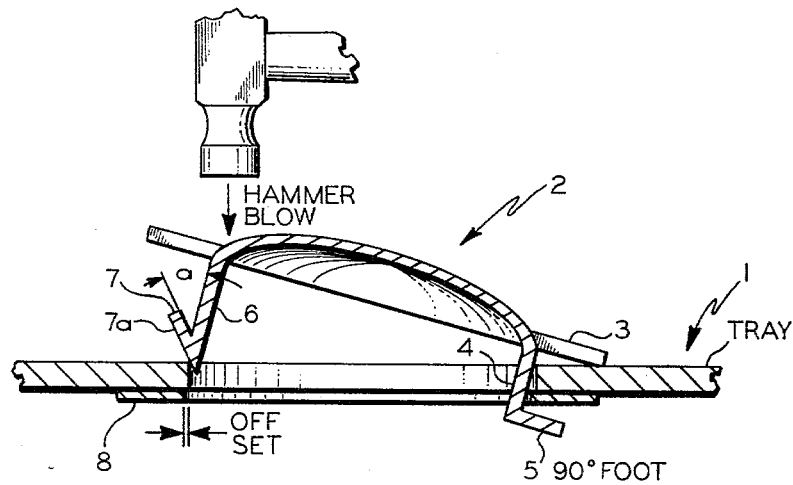
FIG. 1 is an elevational cross-section of a valve body according to the invention shown in juxtaposition with an opening in a fractionator tray at a moment just prior to the application of pressure by way of a hammerblow to cause said valve body to become espoused, movably, within the tray opening shown.

This invention relates to a fractionator valve body. In one of its aspects the invention relates to a fractionator valve body which can be snapped into position in an opening in a fractionator tray. In another of its aspects the invention relates to a method of installing a fractionator valve body as herein described.

In one of its concepts, the invention provides a valve body having depending therefrom at least two legs at least one of which is deformable and so shaped that the valve body can be installed in a tray as in a fractionator and become retained movably in said tray.

In another of its concepts, the invention provides a valve body adapted to be installed in an opening in a tray as in a fractionator by simply applying pressure to said valve body held in juxtaposition at said opening with at least one leg of said valve body, as described herein, preliminarily having been inserted into said opening. In a further concept of the invention, there is provided a valve body and its installation, as described herein, wherein a retaining ring is caused to espouse at least two legs of said valve body.

The invention will now be described further in connection with its use as in a valve and a tray assembly as in a fractionation column.

The construction of fractionation columns is at best an expensive matter. A great many hours of installation of valves or bubble caps on each of the many trays of a fractionation column requires much time and in the case of valve bodies to which this invention relates has required two operators or installers to install.

For example, in U.S. Pat. No. 3,815,880, issued June 11, 1974, there is described a valve assembly in association with a contact tray, the valve assembly having laterally spaced legs depending therefrom and the assembly being installed at least by placing the legs within the opening and then bending the lower ends of each of the several legs outwardly. As can be seen by one skilled in the art in possession of this disclosure having studied the same and having studied the disclosure of the patent, the disclosure of which is incorporated herein by this reference, an approach from the upper and lower side of the contact tray is required. Ordinarily, the valve assembly must be held in position while the legs are bent outwardly and this will require two installers for best possible operation in shortest possible time.

We have conceived a valve body or valve assembly design which can be readily installed by only one installer without need for bending legs thereof and by simple application of pressure as by a hammer blow thereto to install it permanently, yet movably, within the opening of a fractionator plate or contact tray.

It is an object of this invention to provide a valve body adapted to be readily installed in a fractionator tray or plate. It is another object of this invention to provide a method for installing a valve body in an opening in a fractionator tray or plate. It is a further object of the invention to provide a valve body so structured and arranged that it can be installed in an opening in a fractionator tray or plate by simple application of pressure thereto, yet be retained movably and permanently in said opening.

Other aspects, concepts, objects, and the several advantages of the invention are apparent from a study of this disclosure, the drawing, and the appended claims.

According to the present invention, there is provided a valve assembly or body adapted to be positioned into and retained in an opening as in a fractionator plate or tray assembly which comprises a valve body larger than said opening and being adapted to be retained movably in said opening above said tray, said body having at least two dependant members defining below said valve body at a place and in a plane removed from the bottom of said plate in substantially horizontal position of said valve body a peripheral size or diameter slightly larger than that of said opening when placed into juxtaposition with said plate, said plate being also in a substantially horizontal position when said juxtapositioning occurs, at least one of said members being sufficiently fleible to be deformed to permit said members to present a momentarily reduced peripheral size when said valve body is pressed downwardly toward said plate thus to prevent said valve body to be snapped into and to be permanently, but movably retained, in said opening.

Also according to the present invention, there is provided a method for installing a valve body or structure as herein described by simply placing said valve body into juxtaposition with an opening in a fractionator tray or plate, as herein described, and applying a pressure thereto to urge said valve toward and into said opening, as with a hammer blow.

Also according to the present invention, there may be held, as may be desired, a retaining ring below said opening and the valve body pressure through said opening and said retaining ring virtually simultaneously.

It will be noted that some means or method for holding the retaining ring to the opening until the legs of the valve body have passed therethrough will be needed. In the case of an added installer, the installer need but hold the ring in place momentarily and the job is done. Or, the retaining ring can be affixed as by some readily yielding cement material to the bottom face of the plate at the opening whereupon the hammer blow will result in simultaneously installing a retaining ring to surround depending members or legs and to break the cement bond. A better, now preferred manner of installing the retaining ring, is to use a cement which will be dissolved or melted away when the tray is placed into operation as when the fractionator tower is being tested or put into the operation for which it has been designed.

In a now preferred embodiment, the self-retaining valve assembly for use in an opening, which is preferably circular, in a tray of a fluid contacting device will comprise a plate of larger diameter than the opening the assembly or valve body being adapted to be retained movably within the opening with its top or top portion remaining above the tray at all times and being retained at a predetermined maximum distance above the tray, when the tray is in operation, by the depending legs which in this preferred embodiment are integrally machined to the cap and depend therefrom at about 90°. The cap and legs can be struck from a single piece of metal or other material as one skilled in the art in possession of this disclosure having studied the same will be able to do.

In a now preferred embodiment of the invention, the depending legs are shaped to have foot portions extending substantially radially outwardly from the leg and bent upwardly to create a wedged face which will coact with the edge of the opening to permit deforming the leg or legs and the consequent installation of the valve body into the opening as by a hammer blow or other pressure applied thereto.

The outward extesions of the feet, as can be seen in the drawings, are sufficient to retain the valve body or assembly within the opening.

To install the valve assembly into the plate opening from the top side of the tray, a single installer, will slip two of the three 90° feet through the opening in the tray and position the acute bend of the upwardly bent or hooked foot at the lip of the opening at the top face of the tray. Then a sharp hammer blow is applied to the top of the valve body. This causes the leg with the hooked foot to be pushed through the opening. The leg resumes its original contour or position relative to the valve body or assembly which is now in operable condition.

The angle at which the leg and or foot is designed, will depend upon the diameter of the opening in the tray and the free area between this opening and an imaginary circle encircling the three legs, i.e., the perimeter circumscribed by these legs. The angles and configurations of the valve body or assembly, including the legs, and the shape and configuration of the legs, can be determined by mere routine testing by one skilled in the art in possession of this disclosure having studied the same. Usually, an acute angle between the leg and the turned-up foot will be in the range of from about 40° to about 75°. A working example had an uptilt of about 60° subtended between the leg and the upturned foot.

Figure 3:
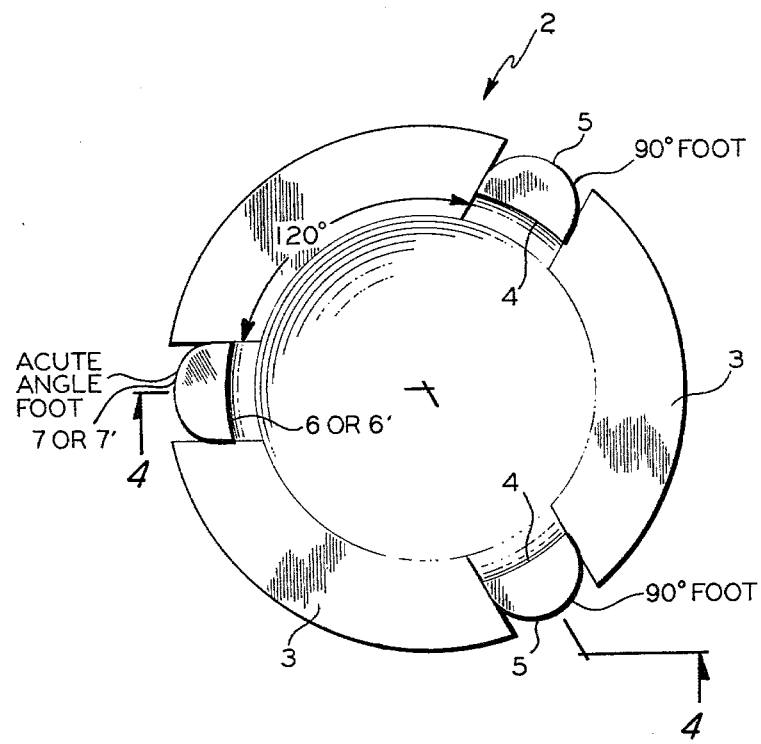
FIG. 3 is a plan view of the valve body looking down on top of the valve body.

Although the now preferred embodiment will have three legs, see FIG. 3, more than three legs or less than three can be adapted in the invention. Thus, only two legs can be used and only one foot turned up at the acute angle described. In the drawing, the upper surface of each 90° foot is shown to be in about the same place as the tip of the acute angle foot in the preferred embodiment, as in the example above mentioned, the bottom of each 90° foot is in about the same plate with the bottom or angled portion of the acute-angle foot.

When a wear-washer or retaining ring, adapted to retain away from the bottom face of the plate, the feet of the downwardly extending members of the valve body is used installation can be as follows. The wear-washer can be momentarily held in place manually or by a suitably designed holding means while the valve body is pressed through the opening and through the correspondiing opening in the wear-washer or retaining ring.

To more fully illustrate the invention as in connection with a now preferred form thereof, reference is made to the drawings.

Referring now to FIG. 1, there is positioned as shown, into the opening of a tray 1 a valve 2 having segments 3 as more fully illustrated at 3 in FIG. 3. A segment 3 overlaps tray 1 while leg 4 having foot 5 is in a position below tray 1. When three legs, as more fully shown in FIG. 3, are machined into the valve body two of the legs will be in the position as shown in FIG. 1 for leg 4 and its foot 5. Leg 6 with upwardly oriented foot 7 rests with its wedge face 7a on the perimeter of the opening in tray 1. A pressure as by a hammer blow suitably applied in the direction shown by the downwardly oriented arrow will readily snap into place in the opening in tray 1, the valve 2.

In the event a wear-washer or retaining ring, as shown at 8, is used it will be offset, as shown, during the sinking into the opening of leg 6 so that there will be no interference with the ingress of leg 6 into the opening in tray 1. It will be observed that leg 4 is at an angle with the vertical and will still be at an angle with the vertical until leg 6 has pressed its foot 7 beyond wear-washer 8 which serves to retain away from the underface of the tray the feet 5 and 7 of the legs 4 and 6, thus minimizing wear.

Figure 2:
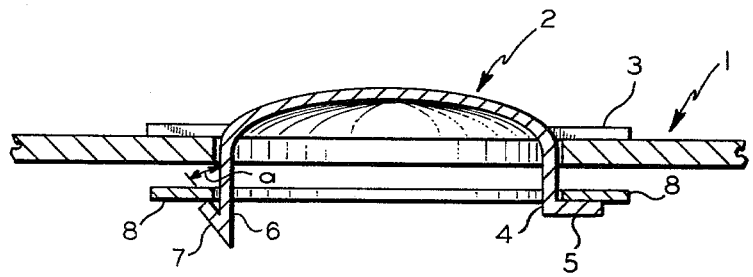
FIG. 2 shows the valve body installed within the tray.

Referring now to FIG. 2 which shows the valve installed, attention is invited to the respective lengths of legs 4 and 6 which neatly accommodate the washer 8 and coact therewith and with the tray underface to maintain valve body too in a horizontal position when vapors are rising upwardly through the opening in the tray. It will be seen that although feet 5 and 7 are differently angled, the structure is so dimensioned that the plate 8 is maintained horizontal by the upper face of foot 5 and by the uppermost point of upwardly tilted foot 7.

Further referring to FIG. 3, it will be seen that the precise positioning of the feet at the lower ends of the respective legs can be varied albeit as shown the perimeter is described by the outermost portion of each of the feet is somewhat larger than the opening in the tray as indicated in the figure.

Figure 4:
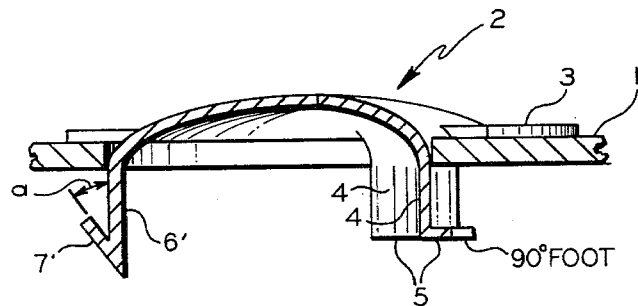
FIG. 4 is a modification of the valve body in which at least one leg is purposefully shorter than at least one other leg.

Referring now to FIG. 4, there is shown a somewhat shorter leg 6'. Shorter leg 6' is shown simply to call attention to the fact that the invention can be adapted to those instances in which for some reason vapor flow is desired to be directed with a horizontal vector as in the case of a tray across which liquid is flowing and there is desired a counter current contact of the vapor with the liquid. In such event the valve body can be designed to avoid any rotation thereof. For example, the valve body, even as earlier implied, can have a rectangular or other shape to coact with a similarly shaped opening. In any event, the relative lengths of leg 4 and leg 6' will be such as to insure the desired vapor-liquid contact in a fractionation operation or in some other counter current contacting of fluids in which the valve body of the invention can be used. The acute angle above-referred-to is shown as a on the figures.

Reasonable variation and modification are possible within the scope of the foregoing disclosure, the drawing, and the appended claims to the invention the essence of which is that there has been provided a valve body having dependant legs extending downwardly therefrom the legs being so shaped or formed as to together form a peripheral dimension somewhat larger than an opening as in a fractionator tray into which the valve body is to be installed the relative sizes or dimensions being such that the valve body can be installed by a downward pressure thereupon substantially as described.

We claim:

1. A fractionator plate comprising a plurality of openings and a valve adapted to be positioned into and movably retained in one of said openings in said fractionator plate, said valve comprising (a) a cap larger than said opening and (b) at least three legs extending from said cap; wherein said valve is a unitary piece of material; wherein said at least three legs are movably retained in said opening; wherein said cap is movably retained above said plate; wherein a first leg of said at least three legs has a foot that extends outwardly at about 90° from said first leg; wherein a second leg of said at least three legs has a foot that extends outwardly at about 90° from said second leg; wherein a third leg of said at least three legs has an outwardly and upwardly oriented foot that presents a wedged contour such that said outwardly and upwardly oriented foot and said third leg form an acute angle; wherein said feet peripherally define an area greater than that of said opening; wherein said third leg is sufficiently flexible to be deformed to permit said feet to present a momentarily reduced peripherally defined area when said valve is pressed downwardly against said plate thus to permit the legs of said valve to be snapped into said opening; and wherein said outwardly and upwardly oriented foot presenting said wedged contour is adapted to at least fit partly into said opening when said first leg and said second leg are within said opening and to present a wedged face to the edge of said opening whereby upon application of downwardly directed pressure on said valve said outwardly and upwardly oriented foot will be deformed inwardly from the edge of said opening until said valve has been mounted in said opening by the passing of said outwardly and upwardly oriented foot through said opening to allow said outwardly and upwardly oriented foot to regain its original position.

2. A fractionator plate in accordance with claim 1 wherein a wear ring is placed to surround said at least three legs of said valve.

* * * * *